Figure 3:
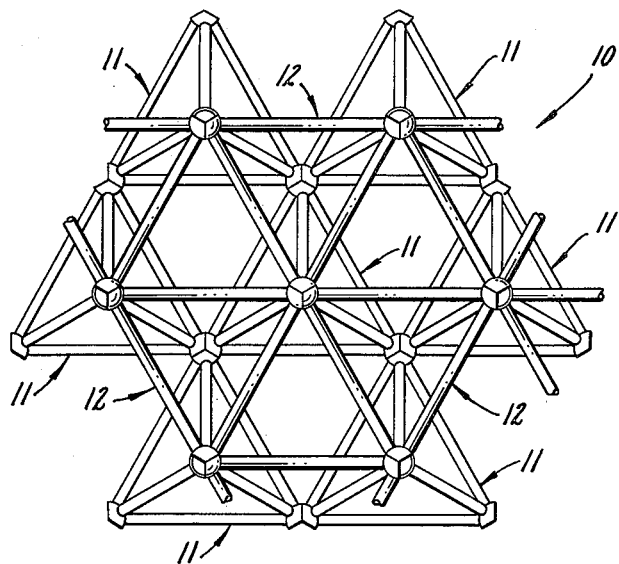

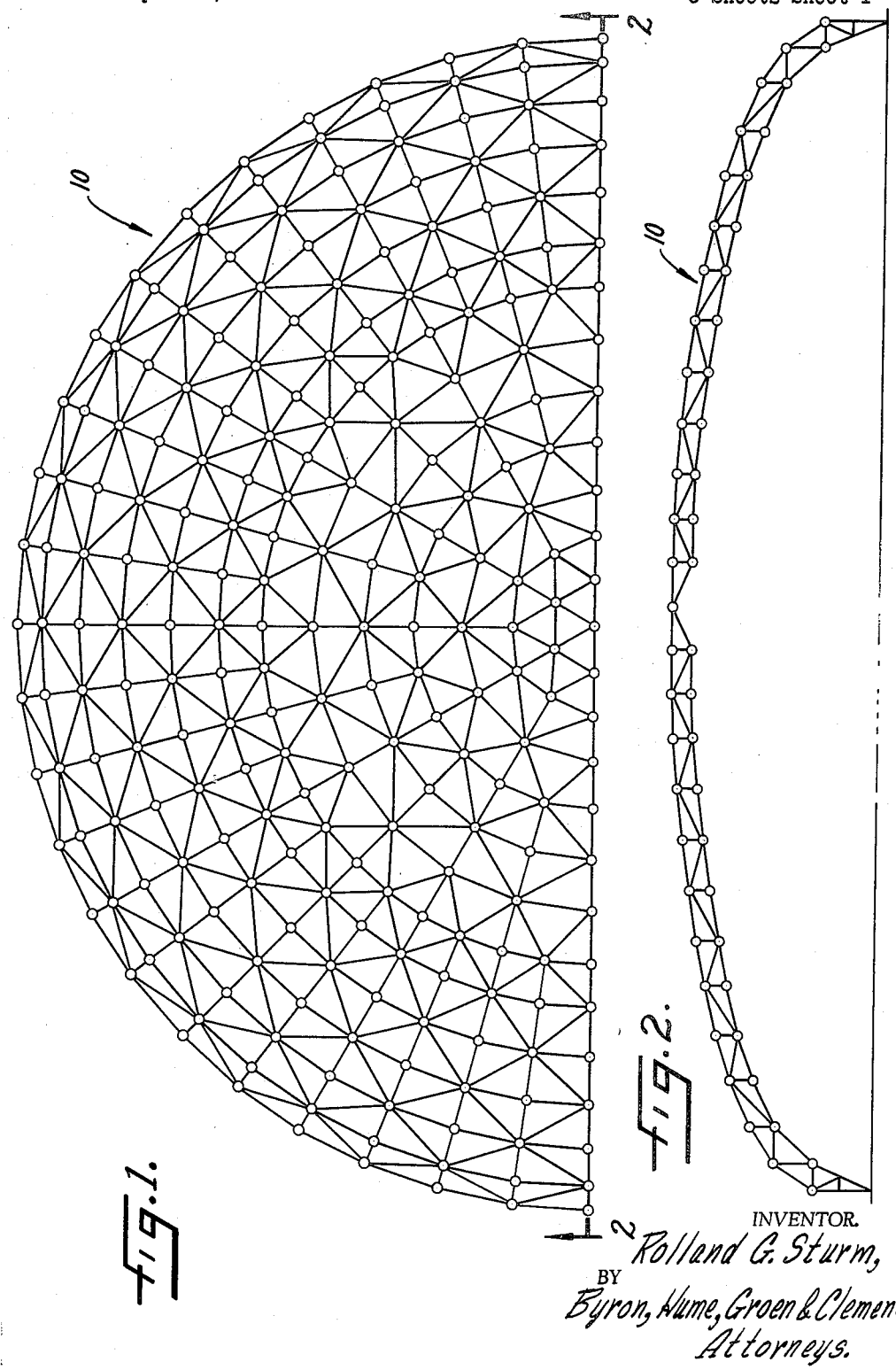

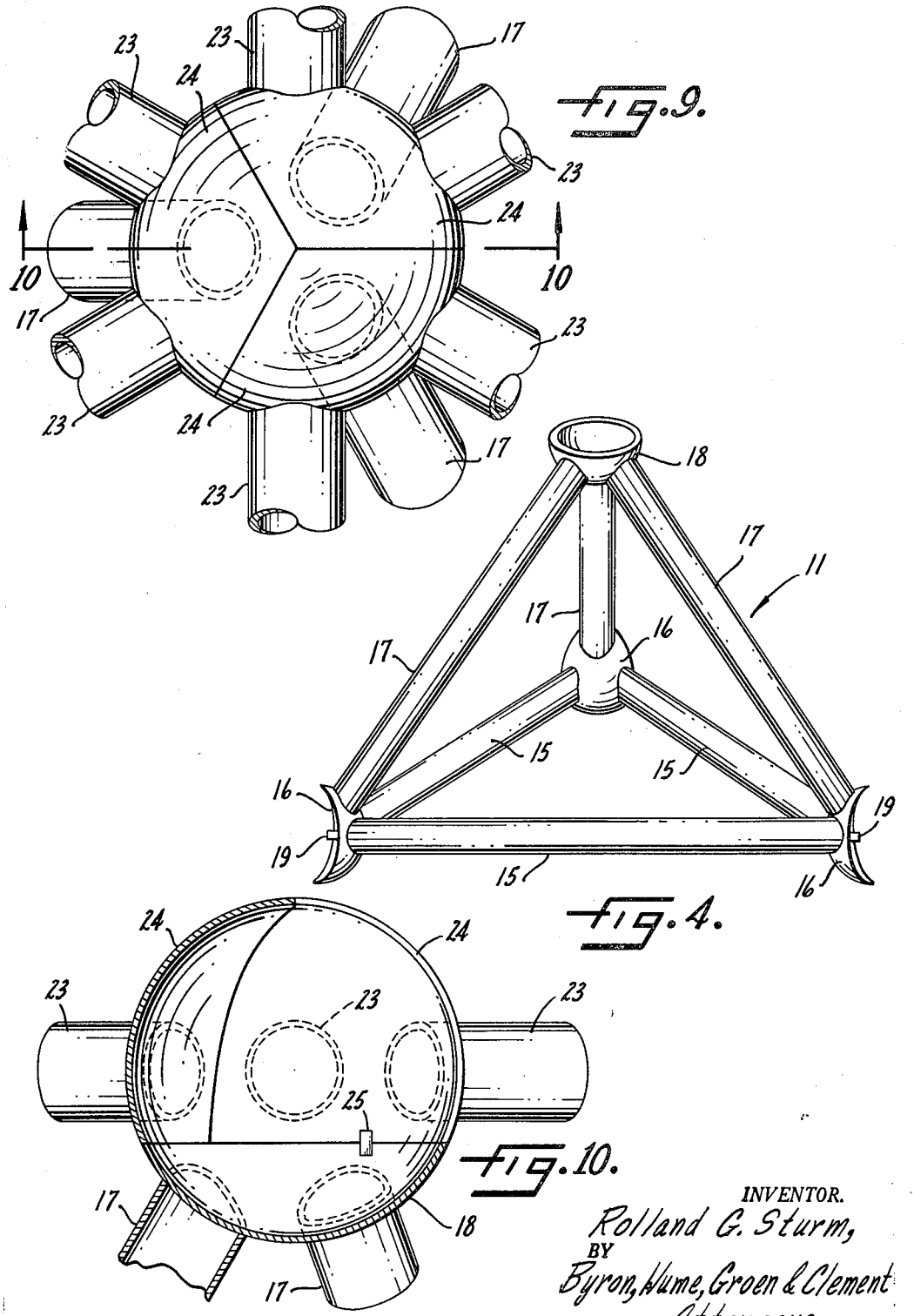

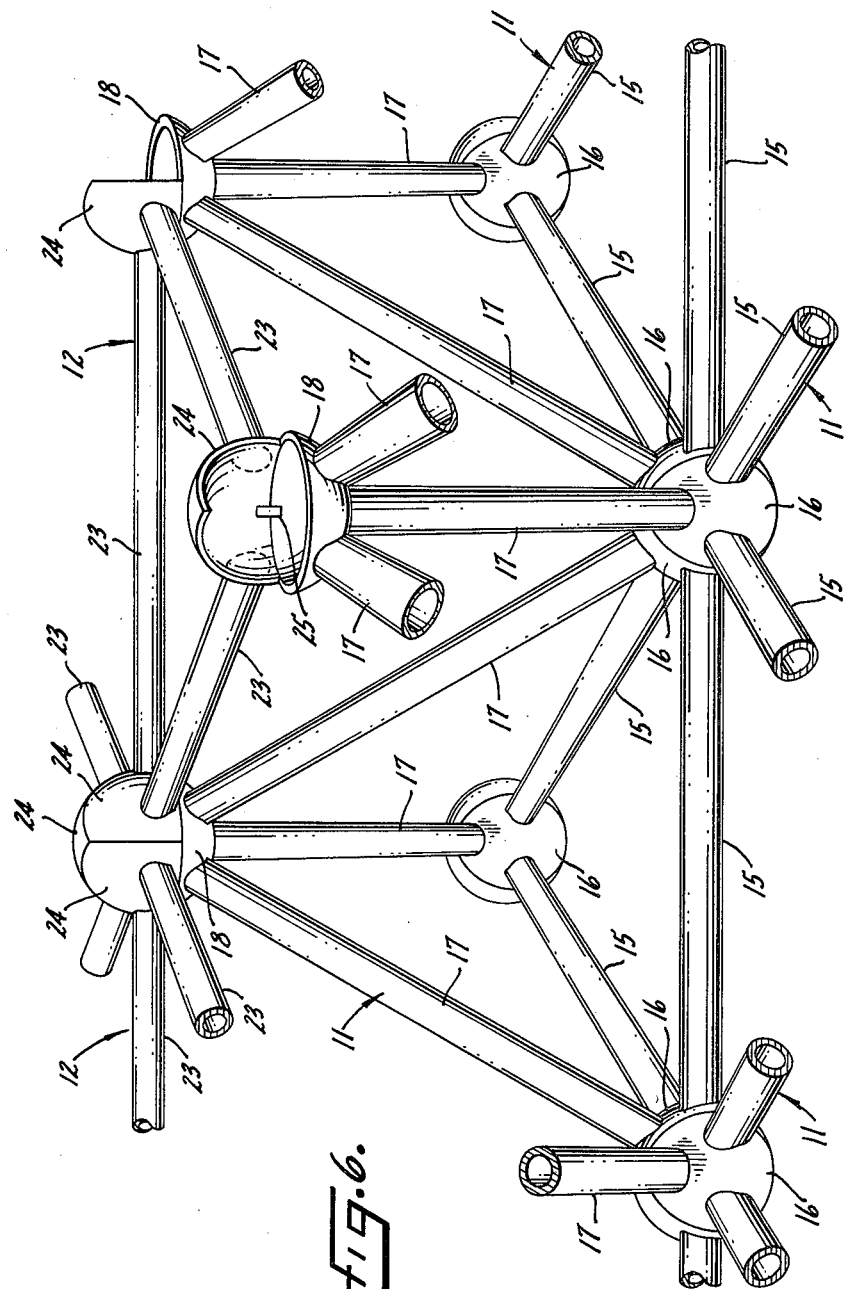

Nov. 30, 1965 R. G. STURM 3,220,152
TRUSS STRUCTURE
Filed Sept. 18, 1961 9 Sheets-Sheet 5

INVENTOR.
Rolland G. Sturm,
BY
Byron, Hume, Groen & Clement
Attorneys.

Nov. 30, 1965    R. G. STURM    3,220,152
TRUSS STRUCTURE
Filed Sept. 18, 1961    9 Sheets-Sheet 6

INVENTOR.
Rolland G. Sturm,
BY
Byron, Hume, Groen & Clement
Attorneys.

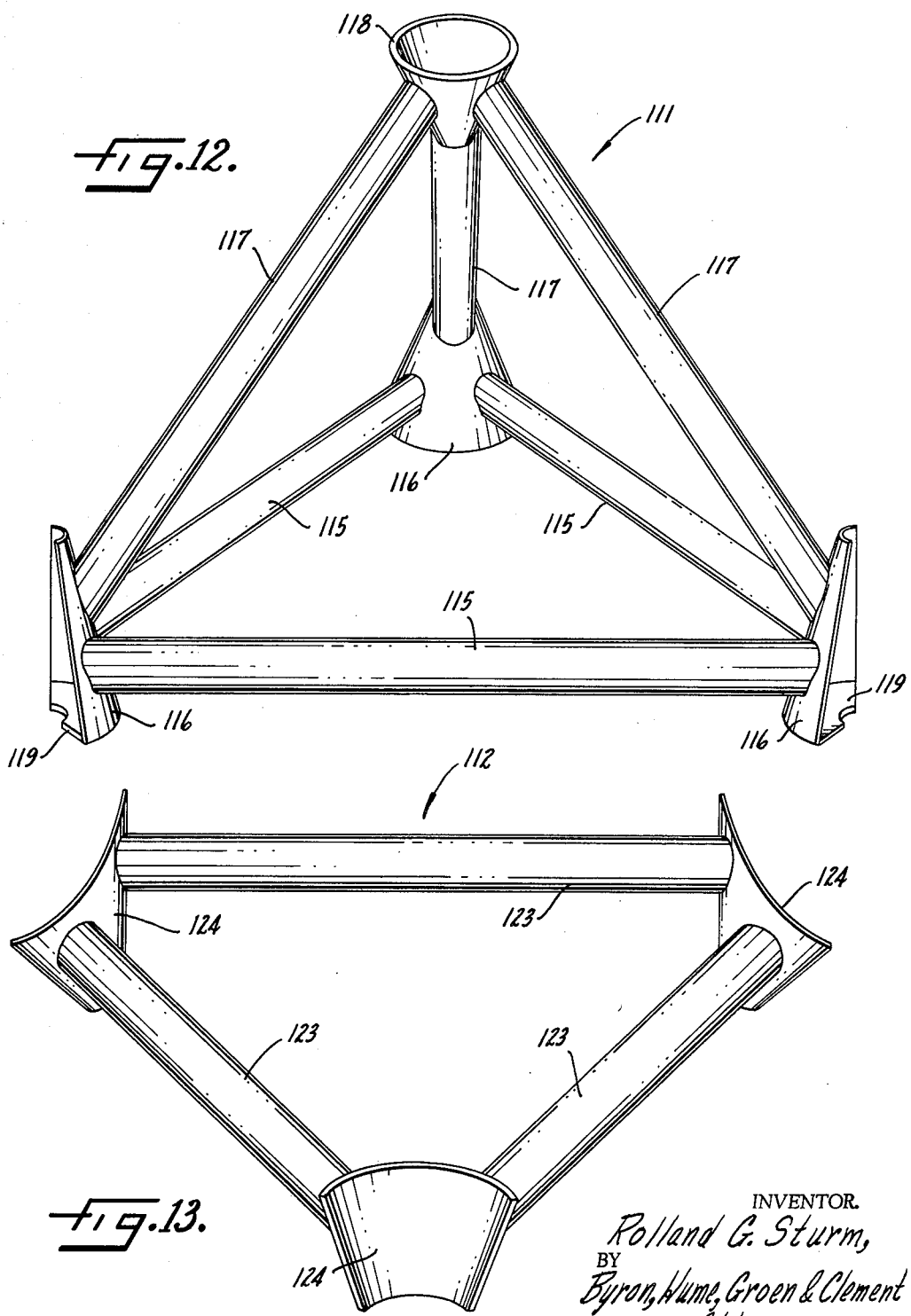

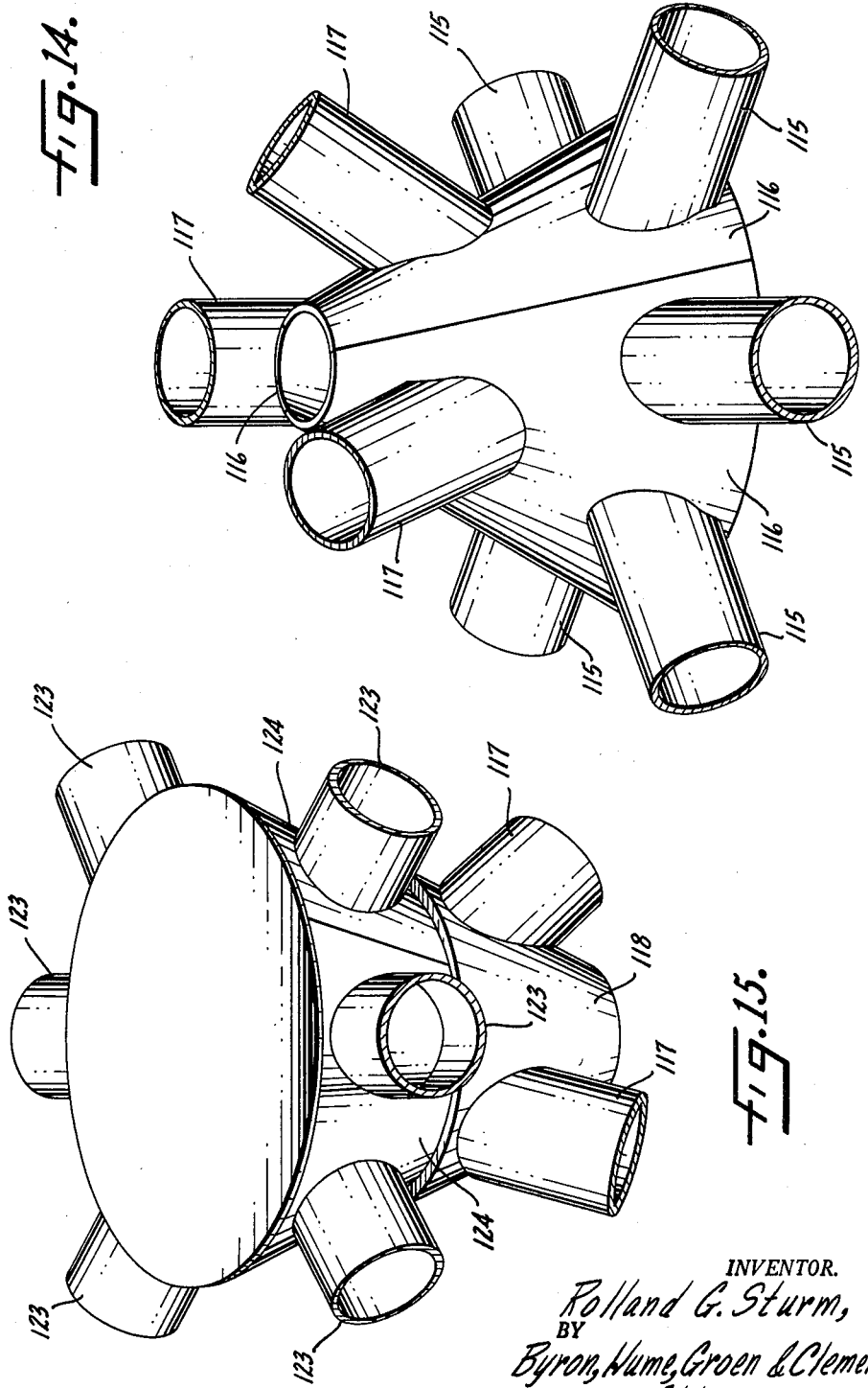

Nov. 30, 1965  R. G. STURM  3,220,152
TRUSS STRUCTURE
Filed Sept. 18, 1961  9 Sheets-Sheet 9

INVENTOR.
Rolland G. Sturm,
BY
Byron, Hume, Groen & Clement
Attorneys.

3,220,152
TRUSS STRUCTURE

Rolland G. Sturm, Auburn, Ala., assignor to Union Tank Car Company, Chicago, Ill., a corporation of New Jersey
Filed Sept. 18, 1961, Ser. No. 138,770
3 Claims. (Cl. 52—648)

This invention relates generally to building structures and more particularly to an improved truss construction. It deals specifically with a truss structure comprised of a plurality of frame units.

An object of this invention is to provide an improved truss construction.

Another object is to provide a simple tetrahedron type truss construction which can be easily and quickly assembled with a minimum of effort.

Still another object is to provide a tetrahedron type truss construction which utilizes a minimum number of component parts.

Yet another object is to provide a truss construction including new and improved basic frame units and connecting frame units for joining them.

A further object is to provide component frame units for a truss construction of this type which may be assembled into prefabricated sections and transported easily.

Another object is to provide new and improved fragmentary joint constructions for interlocking frame units.

The above and other objects are realized in accordance with the present invention by providing a simple and easily fabricated truss structure utilizing basic frame units joined at their bases by unique fragmentary joint means incorporated in the basic frame units and at their apexes by connecting frame units and other unique fragmentary joining means incorporated in both the connecting and basic frame units. Briefly, the invention contemplates the use of a tetrahedral frame units comprising strut means joined at their ends by joint members which are substantially identical to each other and three of which combine to form a complementary interlocking joint defining a geometric structure stable without collateral joint members when the units are assembled. The joint member at the apex of each set of three converging struts completing the tetrahedron is in turn adapted to complement and combine with one joint member from each of three triangular frame units, in a geometric structure stable without collateral joint members the other joint members of which are complementary with and combined with, in interlocking relationship, joint members at the apexes of two other tetrahedral frame units. The result is a truss construction wherein the base strut members of each tetrahedron collectively form the lower face of the truss while the triangular frame units rigidly interconnecting the apexes of the tetrahedral frame units form the upper face of the truss.

One embodiment of this invention contemplates the utilization of semi-spherical joint members which cooperate in complementary fashion and interlock to establish joints between the tetrahedral frame units and the triangular frame unit connecting means which are spherical or generally spherical in configuration and stable geometric structures without collateral joint members. Another embodiment of this invention contemplates the utilization of generally conical and semi-conical joint members which combine and cooperate in interlocking relationship to establish joint structure which is substantially conical in configuration and stable geometric structures without collateral joint members in assembled form. To be more precise certain of the latter component members actually resemble sections of the frustum of a cone. In that respect, though these components will be hereinafter discussed primarily in terms of conical or semi-conical configurations it will be readily understood that such description is intended to encompass configurations resembling the frustum of a cone also.

Figure 5:
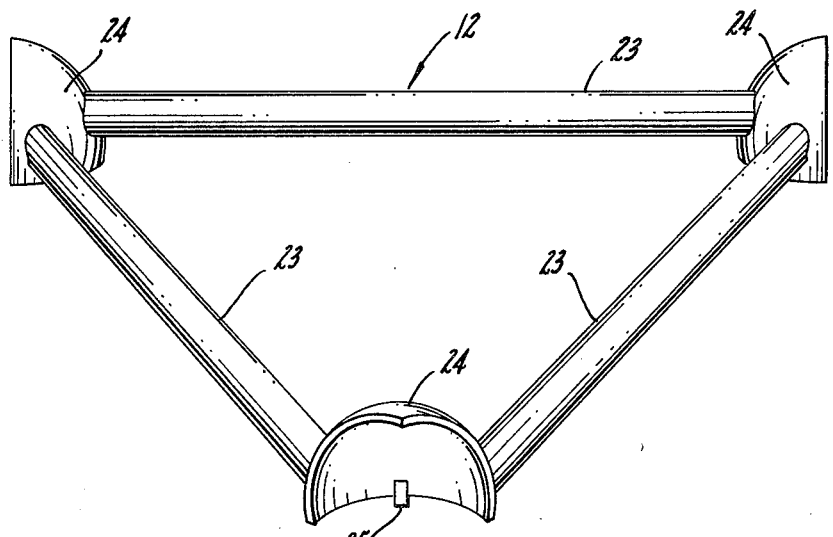
Figure 7:
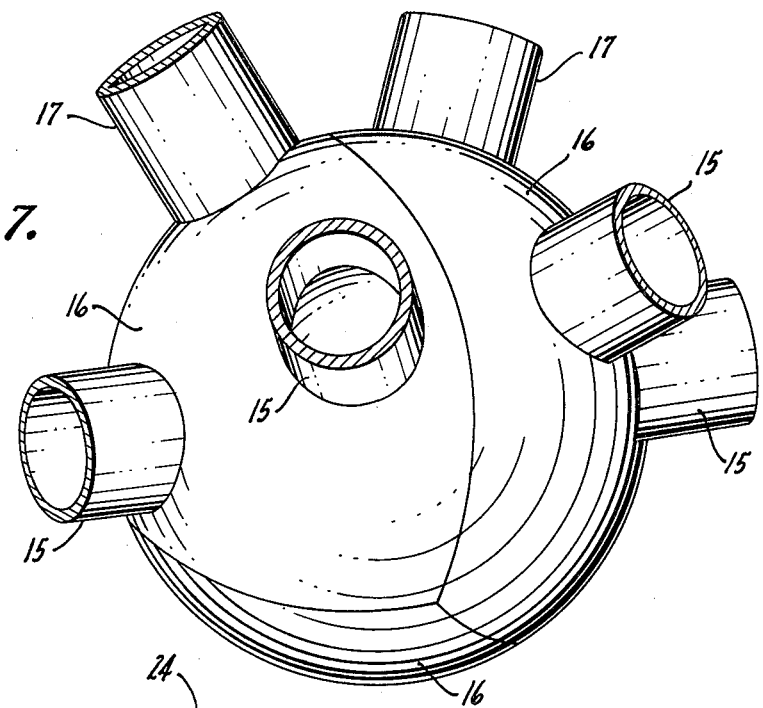
Figure 8:
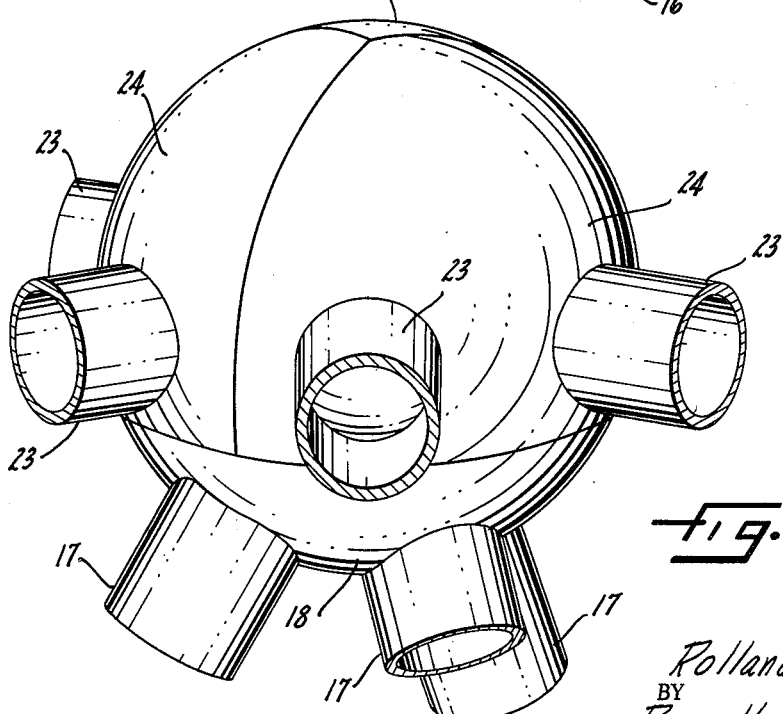
Figure 11:
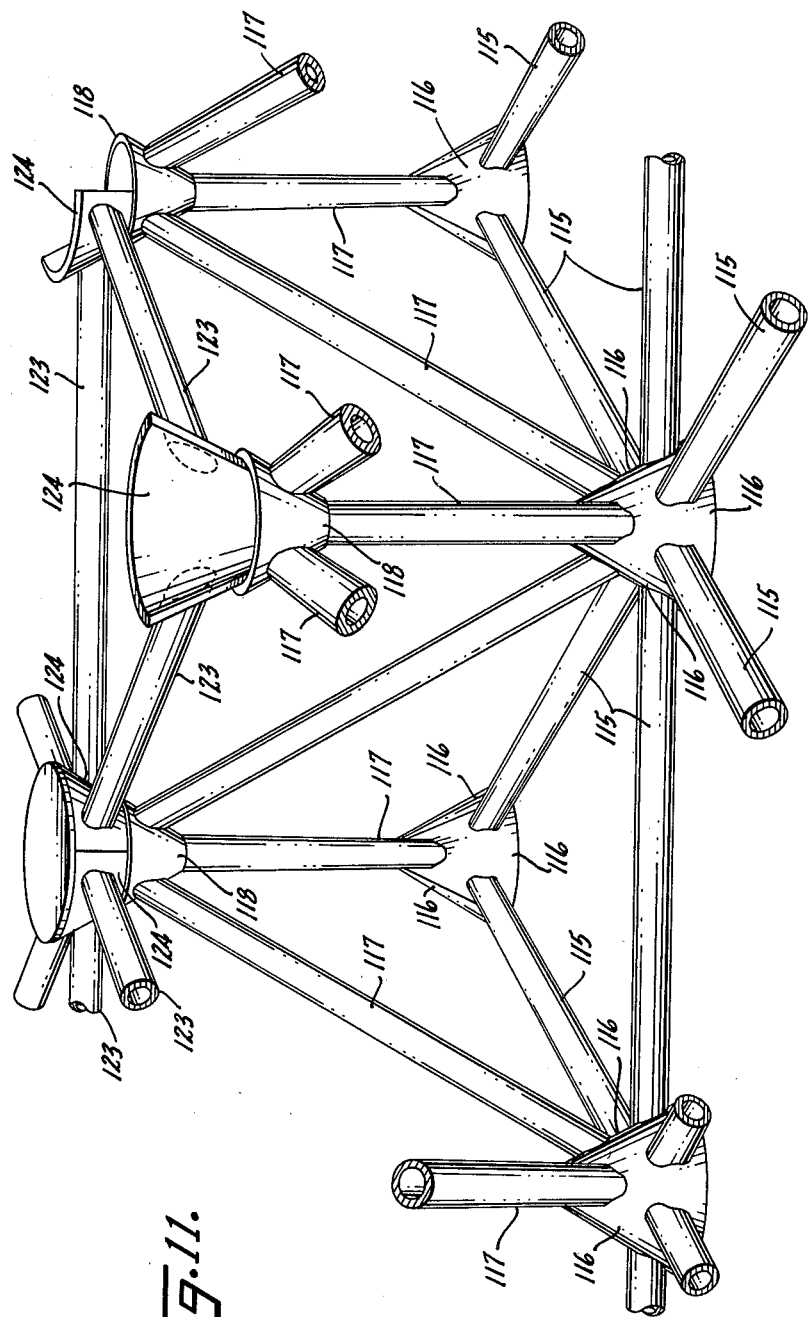
Figure 17:
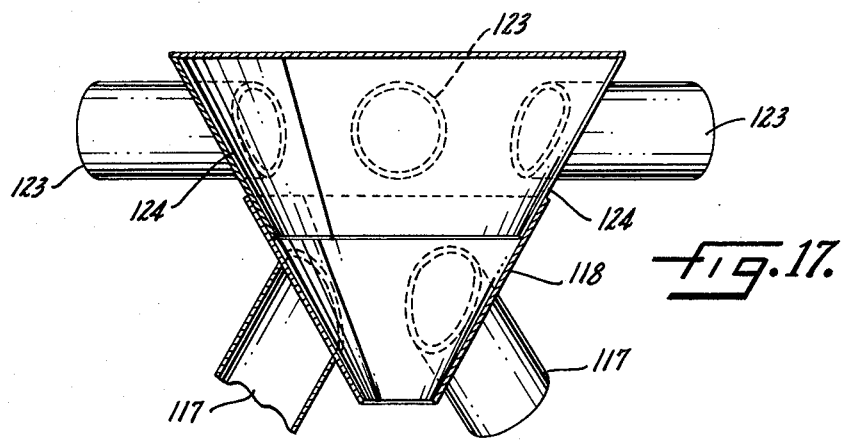
Figure 16:
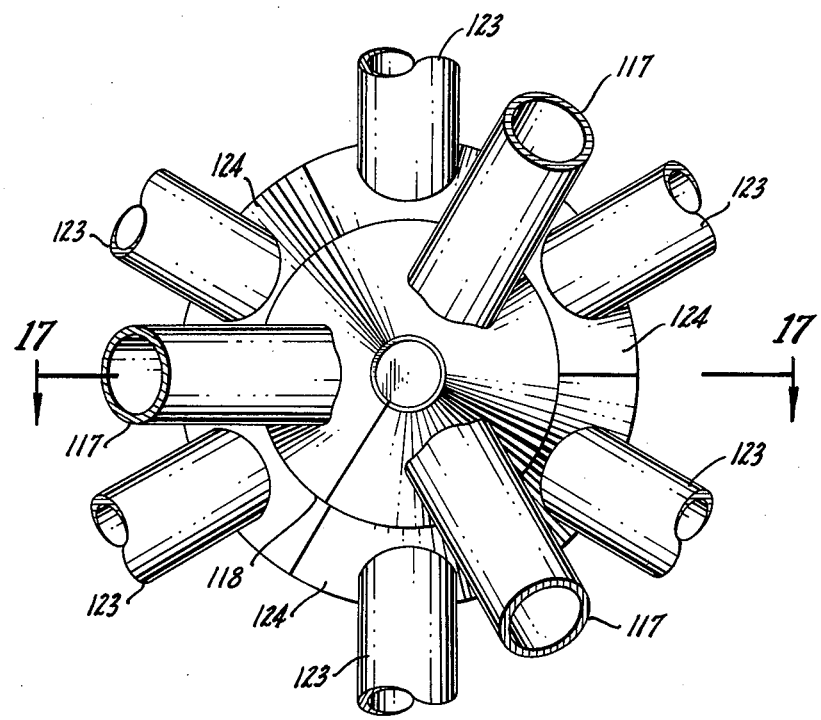

The invention, both as to its organization and method of assembly, taken with further objects and advantages thereof, will best be understood by reference to the following description taken in connection with the accompanying drawings, in which:

FIGURE 1 is a plan view of one half of a dome construction utilizing the truss structure embodying the features of this invention, FIGURE 2 is a view taken along line 2—2 of FIGURE 1, FIGURE 3 is an enlarged plan view of a portion of the truss structure illustrated in FIGURE 1, FIGURE 4 is a perspective view of one embodiment of a tetrahedral frame unit, FIGURE 5 is a perspective view of one embodiment of a triangular frame unit, FIGURE 6 is a perspective view of a partially assembled truss structure, FIGURE 7 is a perspective view of a lower joint in a tetrahedral frame unit, FIGURE 8 is a perspective view of the upper joint of a tetrahedral frame unit, FIGURE 9 is a top plan view of the upper joint illustrated in FIGURE 8, FIGURE 10 is a sectional view taken along line 10—10 of FIGURE 9, FIGURE 11 is a perspective view of a partially assembled truss structure illustrating another embodiment of this invention, FIGURE 12 is a perspective view of a tetrahedral frame unit incorporated in the embodiment of FIGURE 11, FIGURE 13 is a perspective view of a triangular frame unit incorporated in the embodiment of FIGURE 11, FIGURE 14 is a perspective view of a lower joint in a tetrahedral frame unit, FIGURE 15 is a perspective view of an upper joint in a tetrahedral frame unit, FIGURE 16 is a bottom plan view of the upper joint seen in FIGURE 15, and FIGURE 17 is a sectional view taken along line 17—17 of FIGURE 16.

Referring to the drawings and particularly to FIGURES 1 and 2, a building or roof having a dome construction is shown generally at 10. In essence, it is comprised of a truss structure which incorporates a plurality of tetrahedral frame units interconnected at their lower extremities and embodying complementary and substantially interlocking joint members and at their apexes by triangular frame units having joint members complementary and substantially interlocking with the joint members forming the apexes of these tetrahedral frame units.

It has been proposed before, of course, for example in the Parker patent, No. 2,709,975, issued June 7, 1955, to construct a roof truss from a plurality of pyramidal or tetrahedral frame units, the bases of which are connected together to have common sides and the apexes of which are interconnected by rigid coupling members. The construction embodying this invention is an improvement over any such truss construction heretofore known and incorporates identical tetrahedral frame units and distinctly identical triangular frame units having unique complementary and substantially interlocking joint members. In conjunction with this, it can readily be assembled much more expeditiously than generally similar truss structures presently known and because of its unique interlocking joint construction is substantially sturdier.

Although illustrated in FIGURES 1 and 2 in a dome construction, it will be understood that this truss structure is equally adaptable for use in other building units and the description of use in a dome is only exemplary. In this light, although the configuration of variously placed tetrahedral frame units and triangular frame units might vary somewhat depending upon their location in a dome, on the whole they are identical and are described in this application as being such, any variations in strut length, for example, being arbitrarily made for specific purposes only.

FIGURE 3 illustrates an enlarged diagrammatic plan view of a portion or section of the truss construction forming the dome shown generally at 10. This truss construction includes basic tetrahedral frame units 11 and interlocking triangular frame units 12. As will readily be seen, to distinguish between these components of a truss structure constructed in accordance with the principles of this invention, the triangular frame units 12 are illustrated in somewhat darker lines than the tetrahedral frame units. This differentiation is merely exemplary and is limited to the showing in FIGURE 3.

The primary building blocks of such a truss structure are the tetrahedral frame units 11. One embodiment of such a unit is shown in perspective in FIGURE 4. It incorporates joint structure in the form of semi-spherical members, each semi-spherical member being adapted to complement and, for all practical purposes, interlock with a corresponding semi-spherical joint member in another tetrahedral frame unit or a triangular frame unit, depending upon whether the joint in question is a lower joint (at the base of a tetrahedral frame unit) or an upper joint (at the apex of a tetrahedral frame unit) in the unit.

Referring now to FIGURE 4, each tetrahedral frame unit comprises three identical base struts 15. The struts are interconnected at their outer extremities by semi-spherical joint members 16. Converging upwardly from the lower joint members 16 are web struts 17. The web struts 17 are interconnected at the apex of the tetrahedron by a substantially semi-spherical upper joint member 18.

Each lower joint member 16 forms one-third or 120° of a generally spherical joint. It might be compared with a slice of an orange taken along great circles of the orange separated by 120° (spherical). Each member is shell-like in construction and might be formed of light steel or other sheet metal. It is preferably welded to the struts 15 and 17 which might be light steel tubing, for example. A positioning tab is preferably welded to the inside wall of each of the shell-like joint members 16 and extends outwardly of the edge of each member to underlap a complementary joint member and facilitate complementary seating of the joint members prior to welding them together.

The upper joint member 18 is slightly less than semi-spherical in configuration and preferably also formed of light steel or other sheet metal. It resembles the bottom half of a sphere which is sliced off in a substantially horizontal plane at a point slightly below the horizontal great circle of the sphere.

Assembling the tetrahedral frame unit 11 into a truss structure suitable for use in a building or roof construction such as dome 10 involves, first, welding the semi-spherical joint members 16 of a plurality of tetrahedral frame units 11 together in the manner shown in perspective in FIGURE 6. Here it will be seen that the members 16 interlock in complementary relationship to form spheres or generally spherical joints. As has been pointed out, they are preferably welded in this relationship while positioned relative to each other by the tabs 19. In the alternative, however, the semi-spherical members might be strapped or bolted together or connected in any other conventional manner. FIGURE 7 illustrates, in enlarged perspective, an assembled and welded lower joint structure with the struts 15 and 17 welded to the joint members and protruding outwardly from the joint.

The apex of each tetrahedral frame unit 11 is interconnected with the apexes of six adjoining tetrahedral frame units by three separate and identical triangular frame units 12. As seen in FIGURE 5, each triangular frame unit 12 comprises three struts 23 laid out in the shape of an equilateral triangle and interconnected at their outer extremities by segmentally-spherical top joint members 24.

Each top joint member 24 forms one-third or 120° of the upper portion of a sphere whose lower surface is flat and is defined by a generally horizontal plane passing through the sphere below the horizontal great circle of the sphere. In other words, each component 24 resembles one-third of a sphere, or a slice of an orange to use the previous example, wherein a portion of one end of each slice is removed along a plane perpendicular to the axis of the orange. As in the case of each of the joint members hereinbefore described, each top joint member 24 is shell-like in construction and might be formed of sheet steel or the like. A positioning tab 25 is welded to the inside of each shell-like semi-spherical top joint member 24 to facilitate the complementary positioning of corresponding top joint members 24 in position relative to the upper joint members 18 in the appropriate tetrahedral frame unit 11.

When the tetrahedral frame units 11 have been interconnected at their bases in the manner previously described, a network of the aforedescribed triangular frame units 12 is laid over the apexes of the tetrahedral frame units, as seen in FIGURE 6. The triangular frame units are positioned such that each top joint member 24 of a triangular frame unit is complementary with an adjoining top joint member 24 in another triangular frame unit and the semi-spherical shell formed in this manner is complementary with the upper semi-spherical joint member 18 interconnecting the web strut 17 of each tetrahedron at its apex. In this relationship the complementary and substantially interlocking members of each joint form a sphere and are preferably welded together along the seams between abutting joint members. In the alternative the joint members might be bolted together or secured by other conventional means. The assembled and welded upper spherical joint is shown in detail in FIGURES 8 through 10.

Another embodiment of this invention is illustrated in FIGURES 11 through 17. In this modification, the joint structure of the component frame units is comprised of complementary and substantially interlocking joint members having generally segmentally-conical or conical configurations. To be more precise, the members form components of the frustum of a cone rather than a cone itself but in the interest of simplicity, as has previously been pointed out, these configurations will be referred to as being generally conical or segmentally-conical.

The truss construction embodying this modification of the invention is basically similar to the first embodiment. It includes basic tetrahedral frame units 111 and interconnecting triangular frame units 112. The enlarged diagrammatic plan view of a portion or section of a truss construction forming dome 10, as seen in FIGURE 3, is broadly illustrative of the construction of this embodiment as well as the first embodiment.

Referring to FIGURE 12, each tetrahedral frame unit forming a basic building block in this embodiment comprises three identical base struts 115. The struts are interconnected at their outer extremities by lower joint members 116. Converging upwardly from the joint members 116 are web struts 117. The web struts 117 are interconnected at the apex of the tetrahedron by upper joint member 118.

Each lower joint member 116 forms one-third or 120° of a generally conical joint. In other words, three of these joint members 116 are readily combined in complementary relationship to form a cone. As will be seen in FIGURE 12 also, each joint member 116 has a pie shaped base plate 119. Each base plate 119 has a segmentally-circular cut out 120 at its tip. Each joint member is preferably formed of light sheet steel, although it will again be understood that other building materials might be utilized, and is welded to the struts 116 and 117 which might be light steel tubing, for example.

The upper joint member 118 at the apex of each tetrahedron forms a shell-like cone open at its top or base. It is also preferably formed of a light sheet steel and welded to the struts 117 at their upper extremities. The tetrahedral frame units 111 are assembled into a truss structure suitable for use in a dome construction, for example, much in the manner in which the corresponding tetrahedral frame units 11 described in relation to the first embodiment of this invention are assembled.

A lower joint member 116 from each of three tetrahedral frame units is welded into a generally conical joint such as is illustrated in FIGURE 14. Here it will be seen that the joint members 116 interlock in complementary relationship to form cones. A network of these tetrahedral frame units 111 are laid out in a manner shown in perspective in FIGURE 11. As has been previously pointed out in relation to the first embodiment of this invention, the joint members 116 are preferably welded in this relationship although they might be bolted together or connected by any other conventional manner. The base plates 119 are also complementary in abutting relationship to form a composite circular base plate for each lower joint. As will be readily seen the cut outs 120 form an aperture in the center of each plate. These apertures might be used to secure units on the periphery of a truss to a foundation, for example.

The apex of each tetrahedral frame unit 111 is interconnected with the apexes of six adjoining tetrahedral frame units by three separate and identical triangular frame units 112. As will be seen in FIGURE 13, each triangular frame unit 112 comprises three struts 123 laid out in the shape of an equilateral triangle and interconnected at their outer ends by segmentally-conical top joint members 124.

Each top joint member 124 forms one-third or 120° of a cone. In other words, three of these members 124, when joined together, form what might generally be considered a cone, but what is more precisely the frustum of a cone. Each of these members 124 is composed of light sheet steel or the like.

After the tetrahedral frame units 111 have been interconnected and welded in the manner described above, a network of triangular frame units 112 is laid over the apexes of the tetrahedrons, as seen in FIGURE 11. The triangular frame units 112 are positioned such that each top joint component 124 of a frame unit 112 is complementary with an adjoining top joint component 124 of another frame unit 112 and the shell which is formed in the shape of a cone is seated within the conical upper joint member 118 interconnecting the web struts 117 of each tetrahedron at its apex. In this nested relationship the component joint members collectively form what amounts to a cone and they might be welded together in this position or secured by bolts or straps or other conventional means, such in the manner which was described in relation to the first embodiment of this invention. This assembled joint construction is shown in perspective in FIGURE 15 and in bottom plan view in FIGURE 16. A vertical section through the assembled and welded joint members is shown in FIGURE 17.

A truss structure incorporating the construction of either of the aforedescribed embodiments of this invention includes the basic tetrahedron frame unit and triangular frame unit connecting means assembly. In either modification of the joint construction it will readily be seen that one of the primary benefits of the construction is expeditious and easy assembly of the truss structure.

Fewer component parts are required than with other tetrahedron type truss structures utilized today. In this respect, it will be seen that each joint in the truss is structurally completed by components of the frame units themselves, no additional parts being required, for example. The joint construction of the truss structure is such that stresses are evenly distributed on a substantially symmetrical joint whose complementary and interlocking components are identical in configuration throughout the truss structure and consequently interchangeable throughout.

A truss structure incorporating the concepts embodied in either modification of this invention may be prefabricated in sections or panels which can be easily handled and transported from place to place, for example, from storage to wherever a complete truss structure is to be erected. These prefabricated sections, which arbitrarily may be any size, then might be connected to one another and a complete truss structure set up to form, for example, a dome roof.

The building blocks which collectively form the truss structure embodying this invention are suitable for mass production since a minimum number of elements, the majority of which are identical, recur throughout each of the tetrahedral frame units and the triangular frame unit conecting means. The consummate ease of assembly and minimum manpower requirements can be generally attributed to this construction.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A truss structure comprising a plurality of tetrahedral frame units, each of such tetrahedral frame units including three base members, three lower joint members rigidly connecting said base members, each of said lower joint members being substantially identical in configuration and defining one-third of a stable geometric joint structure, a web member rigidly connected to each lower joint member, said web members converging to an apex, an upper joint member rigidly connecting said web members at the apex, three of said lower joint members being rigidly interconnected in complementary interlocking relationship to form a lower joint between three of said tetrahedral frame units in the form of stable geometric joint structure without collateral joint members, a plurality of triangular frame units, each of said triangular frame units comprising three side members, three top joint members rigidly interconnecting said side members, each of said top joint members being rigidly interconnected with two other top joint members in adjoining triangular frame units and to an upper joint member on one of said tetrahedral frame units in complementary interlocking relationship to form an upper joint between corresponding triangular frame units and tetrahedral frame units, said upper joint comprising a stable geometric joint structure without collateral joint members.

2. The truss structure of claim 1 further characterized in that each of said joint members is segmentally spherical in configuration, each of said joints being comprised of joint members forming a completely spherical structure.

3. The truss structure of claim 1 further characterized in that each of said joint members are segmentally conical in configuration, each of said joints being formed of joint members which form a substantially frusto-conical structure in assembly.

References Cited by the Examiner
UNITED STATES PATENTS

| | | | |
|---|---|---|---|
| 1,783,281 | 8/1932 | Brunner | 287—54 |
| 2,682,235 | 6/1954 | Fuller | 189—36 |
| 2,709,975 | 6/1955 | Parker | 189—34 |
| 2,929,473 | 3/1960 | Lindsay | 189—34 |
| 2,931,467 | 4/1960 | Fentiman | 287—54 |
| 2,964,147 | 12/1960 | Fentiman | 189—34 |
| 2,967,379 | 1/1961 | Small | 50—53 |
| 2,986,241 | 5/1961 | Fuller | 189—1 |
| 3,006,670 | 10/1961 | Schmidt | 287—54 |

HARRISON R. MOSELEY, *Primary Examiner.*

CORNELIUS D. ANGEL, *Examiner.*